United States Patent

Kuboki

(10) Patent No.: US 8,883,328 B2
(45) Date of Patent: Nov. 11, 2014

(54) PERPENDICULAR MAGNETIC RECORDING MEDIUM

(75) Inventor: Yoshiyuki Kuboki, Matsumoto (JP)

(73) Assignee: Fuji Electric Co., Ltd. (JP)

(*) Notice: Subject to any disclaimer, the term of this patent is extended or adjusted under 35 U.S.C. 154(b) by 525 days.

(21) Appl. No.: 12/396,714

(22) Filed: Mar. 3, 2009

(65) Prior Publication Data

US 2009/0226765 A1 Sep. 10, 2009

(30) Foreign Application Priority Data

Mar. 4, 2008 (JP) ................ 2008-054001

(51) Int. Cl.
*G11B 5/66* (2006.01)
*G11B 5/73* (2006.01)
*G11B 5/65* (2006.01)

(52) U.S. Cl.
CPC ............ *G11B 5/65* (2013.01); *G11B 5/7325* (2013.01); *G11B 5/732* (2013.01)
USPC .................................................. 428/831.2

(58) Field of Classification Search
USPC ............................................ 428/831, 831.2
See application file for complete search history.

(56) References Cited

U.S. PATENT DOCUMENTS

| 5,789,090 | A * | 8/1998 | Okumura et al. ........... 428/831 |
| 2003/0138666 | A1* | 7/2003 | Gouke et al. ............. 428/694 T |
| 2004/0033390 | A1* | 2/2004 | Oikawa et al. ......... 428/694 MM |
| 2006/0177702 | A1* | 8/2006 | Ajan ......................... 428/828.1 |
| 2006/0204791 | A1* | 9/2006 | Sakawaki et al. ......... 428/828.1 |
| 2006/0269797 | A1* | 11/2006 | Lu et al. ...................... 428/834 |
| 2007/0153419 | A1 | 7/2007 | Arai et al. |
| 2007/0223142 | A1* | 9/2007 | Takekuma et al. ........... 360/131 |
| 2008/0213630 | A1* | 9/2008 | Choe et al. ................... 428/832 |

FOREIGN PATENT DOCUMENTS

| JP | 8-273155 A | 10/1996 |
| JP | 2002-100036 A | 4/2002 |
| JP | 2003-223707 A | 8/2003 |
| JP | 2007-184019 A | 7/2007 |
| JP | 2008-010088 A | 1/2008 |

OTHER PUBLICATIONS

Takenoiri et al, "CoPtCr-SiO2 Granular Perpendicular Recording Media" J. Magn. Soc. Jpn., 2003, vol. 27, No. 9, pp. 940-945. English Abstract provided. Cited in Specification.

H. Nakagawa et al, "CoB/Pd Multilayers With PtB/Pd/MgO Intermediate Layers for Perpendicular Magnetic Recording", IEEE Transactions on Magnetics, 2003, vol. 39, No. 5, pp. 2311-2313. Cited in Specification.

Japanese Office Action, dated Jul. 12, 2011, which corresponds to JP 2008-054001. No English translation.

* cited by examiner

*Primary Examiner* — Holly Rickman
*Assistant Examiner* — Linda Chau
(74) *Attorney, Agent, or Firm* — Rossi, Kimms & McDowell LLP

(57) ABSTRACT

A perpendicular magnetic recording medium having a soft magnetic backing layer is disclosed. The medium has reduced Co elution, improved corrosion resistance, and satisfactory electromagnetic transducing characteristics, without providing constraints on the configuration of the protective layer such as, for example, the thickness of the protective layer, film deposition processes or layer configuration.

15 Claims, 1 Drawing Sheet

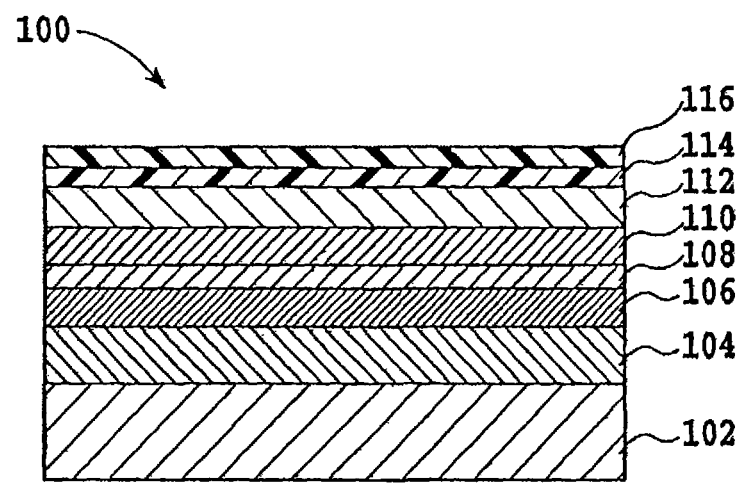

PERPENDICULAR MAGNETIC RECORDING MEDIUM

BACKGROUND OF THE INVENTION

A. Field of the Invention

The invention relates to a perpendicular magnetic recording medium suitable for high-density magnetic recording.

B. Description of the Related Art

In recent years there have been mounting demands for magnetic recording media capable of higher recording densities. Lately perpendicular magnetic recording methods to perform recording with the easy axis of magnetization of the recording layer oriented in the perpendicular direction have been commercialized, and recording densities demands have increased further. High thermal stability, lower noise, and reduced magnetic spacing are necessary in order to raise recording densities. One measure to reduce the magnetic spacing is the method of making the protective layer formed on the magnetic layer thinner. However, as the protective layer is made thinner, Co elution increases. In addition, deterioration of sliding durability becomes prominent, so that reliability problems emerge. A soft magnetic backing layer is necessary in perpendicular magnetic recording methods. The Co-based alloy or other soft magnetic backing layer has a composition ratio resulting in poorer corrosion resistance than the Co-based alloy of the magnetic layer, so that in perpendicular magnetic recording, Co elution is primarily from the soft magnetic backing layer. This problem is made more serious by reduction of the thickness of the protective layer.

As an approach to prevent Co elution due to a thinner protective layer, for example, a method has been proposed in which a Pt group element other than Pt and an element with negative electrode potential are added to the magnetic layer (see for example, Japanese Patent Laid-open No. 2003-223707 (US2003138666A1)). However, methods of adding elements to the magnetic layer are thought not to have much effect for small amounts added, so that large amounts of the above elements must be added. Addition of such excessive amounts of these elements is thought to induce degradation of the magnetic characteristics and electromagnetic transducing characteristics. In particular, an element in the Pt group other than Pt has a large atomic radius, and it is thought that adjustment of the composition of a layer other than the magnetic layer, such as the intermediate layer, the underlayer or the like, or adjustment of the film deposition process, is also necessary. It is thought that elution of Co from the magnetic layer can be suppressed, but it is believed that there is no effect in reducing Co elution from the soft magnetic backing layer.

As another approach, for example, a method has been proposed using material high in corrosion resistance, in which the seed layer is formed from two layers, which are an amorphous Cr alloy and an fcc structure Ni alloy (Japanese Patent Laid-open No. 2007-184019 (US2007153419A1)).

Another method is a method of providing one intermediate layer, with passivation treatment performed, between the magnetic layer and the protective layer (see, for example, Japanese Patent Laid-open No. 8-273155). However, there is the problem that the magnetic spacing is increased by the addition of such an intermediate layer.

As still another method, a technique has been proposed in which Cr and hard minute particles are added to the protective layer (see, for example, Japanese Patent Laid-open No. 2002-100036). However, functions required of the protective layer include not only prevention of Co elution, but also durability with respect to sliding and other functions, and to limit the material to prevention of Co elution greatly hinders the object of maximizing other functions of the layer.

The present invention is directed to overcoming or at least reducing the effects of one or more of the problems set forth above.

SUMMARY OF THE INVENTION

This invention was devised in light of the above problems, and provides a perpendicular magnetic recording medium having a soft magnetic backing layer in which Co elution is reduced and corrosion resistance is enhanced. The medium has satisfactory electromagnetic transducing characteristics, without providing limitations on the conditions or configuration of the protective layer, such as, for example, on the thickness of the protective layer, the film deposition process of the protective layer, the layer configuration of the protective layer, or similar (in other words, without additional conditions or configurations for the protective layer used in the past in perpendicular magnetic recording media).

In this invention, a perpendicular magnetic recording medium has a nonmagnetic substrate, and on the nonmagnetic substrate at least a soft magnetic layer, a seed layer on the soft magnetic layer, an intermediate layer on the seed layer, a magnetic layer on the intermediate layer, and a protective layer on the magnetic layer. It is characterized in that the seed layer comprises a crystalline alloy having the fcc structure or the hcp structure; that a corrosion prevention layer is provided between the seed layer and the intermediate layer; that the corrosion prevention layer comprises the element Cr and at least one element selected from among Ni, W, Mo, Nb, Ta, and Ti; and that the total atomic ratio of all components other than Cr is equal to or less than 40 at %.

It is preferable that the seed layer of this invention comprises the element Ni or Co and at least one element selected from among Cr, Ta, W, Fe, Mo, Nb, Zr, Si, and B.

It is preferable that the film thickness of the corrosion prevention layer be from 1.0 nm to 0.3 nm. It is preferable that the intermediate layer comprise the element Ru. It is preferable that the magnetic layer further comprises Pt, Cr and O, and it is preferable that the nonmagnetic substrate be any one of glass, aluminum, and silicon.

A perpendicular magnetic recording medium can be obtained with reduced Co elution, improved corrosion resistance, and having satisfactory electromagnetic transducing characteristics, without adding conditions or new configurations to the protective layer of the prior art.

In a perpendicular magnetic recording medium of this invention, having a nonmagnetic substrate, at least a soft magnetic layer on the nonmagnetic substrate, a seed layer on the soft magnetic layer, an intermediate layer on the seed layer, a magnetic layer on the intermediate layer, and a protective layer on the magnetic layer, the seed layer comprises a crystalline alloy having the fcc structure or the hcp structure; a corrosion prevention layer is provided between the seed layer and the intermediate layer; the corrosion prevention layer comprises the element Cr and at least one element selected from among Ni, W, Mo, Nb, Ta, and Ti; and the total atomic ratio of all components other than Cr is equal to or less than 40 at %.

BRIEF DESCRIPTION OF THE DRAWINGS

The foregoing advantages and features of the invention will become apparent upon reference to the following detailed description and the accompanying FIGURE of drawing, which is a summary view showing the cross-sectional structure of a perpendicular magnetic recording medium in one embodiment of the invention.

DETAILED DESCRIPTION OF SPECIFIC EMBODIMENTS

As the result of diligent studies by the inventors, it was discovered that Co elution from a perpendicular magnetic recording medium occurs due to the following factor. In nearly all cases, no texture is provided in a perpendicular magnetic recording medium, but when a $CoPtCr$—$SiO_2$ granular magnetic layer (see, for example, Japanese Patent Laid-open No. 2003-223707 (US2003138666A1)), a Co/Pd artificial-lattice magnetic layer (see, for example, H. Nakagawa et al., "CoB/Pd multilayers with PtB/Pd/MgO intermediate layers for perpendicular magnetic recording", *IEEE Trans. Magn.*, Vol. 39, No. 5, pp. 2311-2313, 2003), or similar is used in the magnetic layer, irregularities appear prominently on the magnetic recording medium surface. This is due primarily to the layer structure of the intermediate layer and magnetic layer. When a protective layer is formed on a surface on which such irregularities are formed, no problems arise when the protective layer is thick, but as the thickness is reduced, the effect of the surface irregularities results in reduced coverage. As a result, regions not covered by the protective layer appear, and these become routes for Co elution.

Ru generally is used as the intermediate layer in a perpendicular magnetic recording medium. Crystal grain boundaries are clear in the magnetic layer and this Ru intermediate layer of a perpendicular magnetic recording medium in order to reduce noise. When the layers are formed normally, no problems arise, but when foreign matter exists on the substrate, in grain boundaries of layers, and in other places, ruptures begin from grain boundaries, so that grain boundaries become conduits for water and other matter, and water and similar which has passed through the protective layer can easily reach the soft magnetic backing layer, inducing Co elution and other corrosion.

In light of the above, the inventors have conducted diligent studies, culminating in perpendicular magnetic recording media in which Co elution is reduced and corrosion resistance is improved. The media have satisfactory electromagnetic transducing characteristics. That is, a perpendicular magnetic recording medium of this invention is a perpendicular magnetic recording medium in which are layered, in order on a nonmagnetic substrate, at least a soft magnetic backing layer, seed layer, intermediate layer, magnetic layer, and protective layer, and a corrosion prevention layer is provided between the seed layer and the intermediate layer. The perpendicular magnetic recording medium is further characterized in that the constituent materials of the seed layer have as the main component Ni or Co, with at least one element selected from among Cr, Ta, W, Fe, Mo, Nb, Zr, Si, and B added, and in that the seed layer comprises a crystalline alloy having the fcc structure or the hcp structure. Further, the corrosion prevention layer is characterized in that the constituent material has Cr as the main component, with at least one element selected from among Ni, W, Mo, Nb, Ta, and Ti added, and in that the total atomic ratio of components other than Cr is 40 at % or less. Further, the corrosion prevention layer is characterized in having a film thickness of 1.0 nm to 0.3 nm. It is preferable that the magnetic layer comprise Pt, Cr, and O.

By employing the configuration described above for perpendicular magnetic recording media, Co elution can be reduced and corrosion resistance improved without imposing constraints on the configuration of the protective layer, and moreover perpendicular magnetic recording media having satisfactory electromagnetic transducing characteristics can be obtained.

Below, the invention is explained in detail, referring to the drawing.

The drawing is a cross-sectional schematic diagram used to explain an example of the basic configuration of a perpendicular magnetic recording medium of this invention. As shown in the drawing, in a perpendicular magnetic recording medium of the invention, soft magnetic backing layer 104, seed layer 106, corrosion prevention layer 108, nonmagnetic intermediate layer 110, and magnetic layer 112 are layered in order on nonmagnetic substrate 102. Protective layer 114 and liquid lubricant layer 116 are provided on magnetic layer 112.

Basic characteristics of a perpendicular magnetic recording medium of this invention include formation of corrosion prevention layer 108 between seed layer 106 and nonmagnetic intermediate layer 110, the use of appropriate material in this layer, and the use of an appropriate film thickness. In this way, the orientation and grain diameter in the seed layer and nonmagnetic intermediate layer can be maintained, and Co elution can be suppressed, corrosion resistance improved, and satisfactory electromagnetic transducing characteristics obtained, without imposing constraints on the protective layer, including the film thickness of the protective layer, the film deposition process, and the configuration of the protective layer.

Below, the invention is explained in more detail. Nonmagnetic substrate 102 comprises material such as is normally used in a perpendicular magnetic recording medium 100. Specifically, examples can be given of substrates of aluminum, an Al alloy with for example NiP plating, and glass (reinforced glass, crystallized glass, amorphous glass, and similar). Moreover, a silicon substrate can be used as the nonmagnetic substrate.

Soft magnetic backing layer 104 is a layer which prevents spreading of magnetic flux arising from the head during recording, and which acts to secure a perpendicular-direction magnetic field. As the material of the soft magnetic backing layer 104, an Ni alloy, Fe alloy, or Co alloy can be used. For example, by using amorphous CoZrNb, CoTaZr, CoTaZrNb, CoFeNb, CoFeZrNb, CoFeTaZrNb, and similar, satisfactory electromagnetic transducing characteristics can be obtained. The film thickness of the soft magnetic backing layer is adjusted appropriately according to the structure and characteristics of the magnetic head used in recording, but in consideration of mass production, a thickness of 10 nm to 100 nm is preferable.

Soft magnetic backing layer 104 can be deposited using an arbitrary method and conditions which are well known in this field, such as a sputtering method (including a DC magnetron sputtering method and RF magnetron sputtering method), vacuum evaporation deposition method, and similar.

Seed layer 106 is a layer used to control the orientation and grain diameter in nonmagnetic intermediate layer 110. Corrosion prevention layer 108, described below, intervenes between seed layer 106 and nonmagnetic intermediate layer 110. The seed layer comprises the element Ni or Co and at least one element selected from among Cr, Ta, W, Fe, Mo, Nb, Zr, Si, and B. In this invention, it is preferable that seed layer 106 comprise the element Ni or Co, and further comprise two or more elements selected from among Cr, Ta, W, Fe, Mo, Nb, Zr, and Si, in order to improve the orientation of nonmagnetic intermediate layer 110 and to obtain satisfactory perpendicular orientation of magnetic layer 112. The crystal structure of the seed layer is fcc or hcp. This is because the crystal structure of the nonmagnetic intermediate layer and magnetic layer is hcp, and the orientation of the nonmagnetic intermediate layer and of the magnetic layer is better when the structure of the seed layer which is the underlying layer is fcc or hcp, with atoms in a closest-packed configuration. Examples of materials with fcc structure include NiCr, NiCrZr, NiCrSi, NiW, NiWCr, NiFeCr, NiFeSi, NiFeNb, NiFeB, NiFeNbB and NiFeMo. Materials with hcp structure include, for example, CoCr, CoCrW, CoCrZr, CoCrTaZr, CoCrZrNb, CoFeSi, CoCrFeSi, and similar. The film thickness of seed layer 106 is adjusted such that the magnetic characteristics and electromagnetic transducing characteristics of magnetic layer 112 are at desired values, but a thickness of 2 nm or greater and 20 nm or less is preferable. When the film thickness is less than 2 nm, the orientation of nonmagnetic intermediate layer 110 and of magnetic layer 112 is degraded. On the other hand, when the film thickness is greater than 20 nm, the grain diameters in seed layer 106 become large, so that grain diameters in magnetic layer 112, via nonmagnetic intermediate layer 110, are also large, and the electromagnetic transducing characteristic is degraded.

Seed layer 106 can be deposited using an arbitrary method and conditions well-known in the art, such as for example a sputtering method (including DC magnetron sputtering, RF magnetron sputtering, and similar), vacuum evaporation deposition, and similar.

Corrosion prevention layer 108 is a layer provided to prevent corrosion such as Co elution, as well as to pass on the grain diameters and orientation of seed layer 106 to nonmagnetic intermediate layer 110. The material of corrosion prevention layer 108 comprises the element Cr and at least one element selected from among Ni, W, Mo, Nb, Ta, and Ti; the total atomic ratio of all components other than Cr is equal to or less than 40 at %. By making components other than Cr 40% or less, formation of a Cr passivation layer is promoted, and a greater effect in suppressing corrosion can be anticipated. When components other than Cr are present in an amount greater than 40%, the layer structure of the corrosion prevention layer tends to become amorphous, so that the orientation of nonmagnetic intermediate layer 110 and magnetic layer 112 which are above the corrosion prevention layer is degraded. As the material of corrosion prevention layer 108, for example, CrMo, CrW, CrTa, CrNb, CrNi, CrNiMo, CrMoW, CrMoTi, or similar can be used. It is desirable that the film thickness of corrosion prevention layer 108 be in the range 0.3 nm to 1 nm. By forming a corrosion prevention layer with a film thickness in this range, corrosion prevention layer 108 can be made to take either the fcc or the hcp crystal structure, and satisfactory orientation can be maintained, without degraded lattice matching of the corrosion prevent layer with the layers above and below.

When the thickness is greater than 1 nm, a bcc structure is formed because Cr is the main component. Moreover, lattice deformation conforming to the lattice intervals of the layers above and below the corrosion prevention layer is no longer possible. The lattice mismatch becomes large, and orientation is degraded. When the thickness is less than 0.3 nm, irregularities and the like appear on the surface of the lower layer, the corrosion prevention layer cannot be formed in a layer shape, and the ability to prevent corrosion is lost.

Corrosion prevention layer 108 can be deposited by an arbitrary method well-known in this field of engineering, such as a sputtering method (including DC magnetron sputtering and RF magnetron sputtering), vacuum evaporation deposition, and similar. For example, when using DC magnetron sputtering, an Ar gas at a pressure of 1 Pa to 3 Pa can be employed.

Nonmagnetic intermediate layer 110 acts to improve the orientation of magnetic layer 112, suppress grain diameters, and suppress the appearance of an initial-phase growth layer of magnetic layer 112. As the material of nonmagnetic intermediate layer 110, materials having an hcp structure, such as Ru, Re, Ti, Zr, Nd, Tm, and Hf, are preferable. It is preferable that the film thickness of nonmagnetic intermediate layer 110 be in the range 3 nm or greater and 20 nm or less. When thinner than 3 nm, satisfactory crystallinity of nonmagnetic intermediate layer 110 is not obtained, so that orientation is degraded, causing degradation of the orientation and crystal grain separation in magnetic layer 112. Moreover, formation of an initial-phase growth layer of magnetic layer 112 is also promoted. When the thickness is greater than 20 nm, grain diameters in nonmagnetic intermediate layer 110 become too large, so that grain diameters in magnetic layer 112 are also too large. As a result, noise is increased.

Nonmagnetic intermediate layer 110 can be deposited using an arbitrary method and conditions well-known in this field, such as for example a sputtering method (including DC magnetron sputtering and RF magnetron sputtering), and vacuum evaporation deposition.

Magnetic layer 112 is the layer used for information recording, and must be oriented with the easy axis of magnetization in the direction perpendicular to the substrate plane in order to enable use as a perpendicular magnetic recording medium. In particular, it is preferable that the hcp (00.2) plane be oriented parallel to the substrate plane. It is preferable that magnetic layer 112 have a so-called granular structure, with ferromagnetic crystal grains comprising a Co-based alloy surrounded by a nonmagnetic crystal grain boundary the main component of which is an oxide. By means of a granular structure, noise can be reduced. Here, "having an oxide as the main component" means that the inclusion of trace amounts of other components cannot be avoided, and indicates that oxygen exists in a molar ratio of approximately 90 mol % or higher in the nonmagnetic crystal grain boundary.

As the Co-based alloy comprised by the ferromagnetic crystal grains, CoPtCr, CoPt, CoPtSi, CoPtCrB, and other CoPt based alloys, as well as CoCr, CoCrTa, CoCrTaPt, and other CoCr based alloys can be used. A CoPt based alloy is particularly preferable, due to the fact that the Ku value can be set high.

Preferable oxide materials include $SiO_2$, $Cr_2O_3$, $ZrO_2$, and $Al_2O_3$, which have excellent magnetic separation properties with ferromagnetic crystal grains comprising Co base alloys. $SiO_2$ has excellent magnetic separation properties with CoPt based alloy ferromagnetic crystal grains, and so is especially preferable.

Magnetic layer 112 can be deposited using an arbitrary method and conditions well-known in this field, such as for example a sputtering method (including DC magnetron sputtering and RF magnetron sputtering), and vacuum evaporation deposition.

The protective layer is a layer provided to protect the magnetic layer below and also the constituent layers further below, as well as to prevent Co elution. Material normally used in perpendicular magnetic recording media can be employed in protective layer 114. For example, as protective layer 114, diamond-like carbon (DLC), amorphous carbon (preferably diamond-like carbon (DLC)), and other layers primarily comprising carbon, as well as various thin layer materials known as protective layer materials for magnetic recording media, can be employed. As the thickness of protective layer 114, the film thickness employed in ordinary perpendicular magnetic recording media can be used.

The protective layer can generally be formed using a sputtering method (including DC magnetron sputtering and RF magnetron sputtering), vacuum evaporation deposition, a CVD method, or similar.

Liquid lubricant layer 116 is an optional element, but has the purpose of reducing the friction force arising between the protective layer and the head, as well as improving durability and reliability. As the material of the liquid lubricant layer, a material normally used in magnetic recording media can be employed. For example, a perfluoro polyether system lubricant can be used. Film thickness and the like of lubricant layer 116 can be the same thickness and similar as are employed in ordinary perpendicular magnetic recording media. The lubricant layer can be formed by the dip coating method, spin coating method, or any other arbitrary application method known in this engineering field.

Below, examples of the invention are explained. However, these examples are merely representative examples used to explain the invention, and in no way limit the scope of the invention.

Magnetic recording media of Example 1 and Comparative Examples 1 through 4 were fabricated using the configuration shown in the drawing, with a corrosion prevention layer either provided or not provided, with the film thickness of the corrosion prevention layer varied, and with the film thickness of the protective layer varied. Moreover, the materials of the seed layer and of the corrosion prevention layer, and the type of substrate, were varied in the fabrication of the magnetic recording media of Comparative Examples 5 and 6 and Examples 2 through 6.

EXAMPLE 1

As nonmagnetic substrate 102, chemically reinforced glass substrate (HOYA Corp. N-5 glass substrate), of diameter 65 mm and plate thickness 0.635 mm, was used. This was washed, and after placement in a sputtering system, a Co5Zr8Nb (where figures represent the atomic percentages of the elements following the figures; in this example, the Zr content is 5 at %, the Nb content is 8 at %, and the remainder is Co; similarly below) target was used, to form CoZrNb soft magnetic backing layer 104 of film thickness 100 nm. Then, a Ni12Fe8B target was used to form seed layer 106 of film thickness 5 nm. Then, Cr25Mo5W was used to form corrosion prevention layer 108 in Ar gas at a pressure of 2.0 Pa, to a thickness of 0.8 nm. Then, nonmagnetic intermediate layer 110 was formed using a Ru target in Ar gas at a pressure of 4.0 Pa, to a film thickness of 12 nm. Then, magnetic layer 112 was formed using a 90 mol % (Co8Cr16Pt)-8 mol % $SiO_2$ target, in Ar gas at a pressure of 4.0 Pa, to a film thickness of 15 nm. Then, carbon protective layer 114 was formed by CVD to a film thickness of 2.5 nm, after which the disc was removed from the vacuum system. Except for the carbon protective layer, all films were deposited using the DC magnetron sputtering method. Thereafter, perfluoro polyether liquid lubricant layer 116 was formed on the magnetic recording medium thus obtained by a dipping method, to form a film of thickness 1.5 nm. The perpendicular magnetic recording medium fabricated in this way was the medium of Example 1.

COMPARATIVE EXAMPLE 1

A procedure similar to that of Example 1 was used to fabricate the magnetic recording medium of Comparative Example 1, except that corrosion prevention layer 108 was not formed.

COMPARATIVE EXAMPLE 2

A procedure similar to that of Comparative Example 1 was used to fabricate the magnetic recording medium of Comparative Example 2, except that protective layer 114 was formed to a film thickness of 3.5 nm.

COMPARATIVE EXAMPLE 3

A procedure similar to that of Example 1 was used to fabricate the magnetic recording medium of Comparative Example 3, except that corrosion prevention layer 108 was formed to a thickness of 1.5 nm.

COMPARATIVE EXAMPLE 4

A procedure similar to that of Example 1 was used to fabricate the magnetic recording medium of Comparative Example 4, except that corrosion prevention layer 108 was formed to a thickness of 0.2 nm.

COMPARATIVE EXAMPLE 5

A procedure similar to that of Example 1 was used to fabricate the magnetic recording medium of Comparative Example 5, except that the material of seed layer 106 was Cr30Mo.

COMPARATIVE EXAMPLE 6

A procedure similar to that of Example 1 was used to fabricate the magnetic recording medium of Comparative Example 6, except that the material of corrosion prevention layer 108 was Cr50Ti.

EXAMPLE 2

A procedure similar to that of Example 1 was used to fabricate the magnetic recording medium of Example 2, except that the material of corrosion prevention layer 108 was Cr30Mo10Ti.

EXAMPLE 3

A procedure similar to that of Example 1 was used to fabricate the magnetic recording medium of Example 3, except that the material of corrosion prevention layer 108 was Cr30Mo10W.

EXAMPLE 4

A procedure similar to that of Example 1 was used to fabricate the magnetic recording medium of Example 4, except that the material of seed layer 106 was Ni30Cr.

EXAMPLE 5

A procedure similar to that of Example 1 was used to fabricate the magnetic recording, except that the material of seed layer 106 was Co30Cr4Fe2Si.

EXAMPLE 6

A procedure similar to that of Example 1 was used to fabricate the magnetic recording medium of Example 6, except that the nonmagnetic substrate was an Al alloy substrate with NiP plating.

The medium of each of the examples and comparative examples was subjected to measurement of Co elution amounts, SNRm, magnetic layer grain diameters, orientation dispersion Δθ50, and seed layer crystal grain structure. Measurement results appear in Table 1.

The Co elution amount was measured by placing the medium in an environment at a temperature of 80° C. and 85% humidity for 96 hours, and then using ICP-MS to measure the amount of Co eluted. In general, elution amounts of 0.05 ng/cm² or less are thought not to be problematic. SNRm was evaluated by a method in which a single-pole head was used to write signals and an MR head was used to read signals. S was the peak value at an isolated-wave magnetization inversion of 716 kFCl, that is, the value equal to one-half the difference between the maximum and minimum values. Nm was the rms (Root Mean Square-inches) value at 60 kFCl.

Δθ50 was the determined by measuring θ-2θ using an X-ray diffractometer, and after measuring the 2θ value at the magnetic layer (00.2) peak, fixing 2θ and scanning θ, and determining the peak half-maximum width.

Crystal grain diameters in the magnetic layer were determined based on 500,000× images taken using a transmission electron microscope, tracing the outlines of crystal grains and performing measurements.

The crystal structure of the seed layer and crystallization of the corrosion prevention layer were judged by observation of cross-sectional TEM lattice images and by micro-electron beam diffraction.

Below, measurement results for the examples and comparative examples are explained in detail.

Example 1 and Comparative Examples 1 through 4 are compared. First, media with and without corrosion prevention layers are compared. Considering the medium of Example 1, which has a corrosion prevention layer, and the medium of Comparative Example 1, without a corrosion prevention layer, while the SNRm is similar, a clear difference in Co elution amounts is observed, and the Co elution amount for Comparative Example 1 is approximately five times greater than for Example 1. Comparing Example 1 and Comparative Example 2, even when there is no corrosion prevention layer, if the protective layer is made approximately 1 nm thicker than in Example 1 as in Comparative Example 2, then the Co elution amount is suppressed, satisfying the criterion value; but the SNRm of Comparative Example 2 is lower by approximately 0.5 dB than in Example 1.

Next, the effect of the thickness of the corrosion prevention layer was studied. Comparative Example 3, with a corrosion prevention layer 1.5 nm thick, had a Co elution amount which was suppressed as compared with Example 1, but the SNRm was degraded. Looking at Δθ50, the value of Δθ50 for Comparative Example 3 was worse than that of Example 1. Worsening of the SNRm is thought to be caused in part by orientation degradation. Comparative Example 4, which had a corrosion prevention layer 0.2 nm thick, had no SNRm worsening compared with Example 1, but the Co elution amount was increased. This is attributed to the fact that the corrosion prevention layer was too thin, so that the corrosion prevention layer was not formed in a layer shape.

Next, Example 1 through Example 6 are compared with Comparative Examples 5 and 6. Comparative Example 5 is an example in which the material of the seed layer was Cr30Mo. Results for Comparative Example 5 indicate no worsening of the Co elution amount, but worsening of the SNRm and Δθ50 were observed. Upon using TEM cross-sectional lattice images and micro-electron beam diffraction to analyze the seed layer structure, it was found that the seed layer had a bcc structure. This suggests that the SNRm worsening arose from the bcc structure of the seed layer and consequent degradation of the orientation in layers above the seed layer.

Comparative Example 6 is a case in which the material of the corrosion prevention layer was Cr50Ti. In Comparative Example 6 also, no worsening of the Co elution amount was seen, but the SNRm and Δθ50 were worsened. TEM cross-sectional lattice images and micro-electron beam diffraction were used to study the corrosion prevention layer structure, and it was found that there was discontinuity of the lattice at the interface between the nonmagnetic intermediate layer and the seed layer. It is thought that the orientation was degraded as a result.

Examples 2 and 3 were media in which the material of the corrosion prevention layer was Cr30Mo10Ti and Cr30Mo10W, respectively.

Regardless of the material used in the examples, no worsening of the SNRm was observed, and the Co elution amounts were smaller than for Example 1. The Co elution amount for Example 3 was particularly small. From this result, it is thought that addition of W is effective for suppressing Co elution.

Examples 4 and 5 are cases in which the seed layer material was Ni30Cr and Co30Cr4Fe2Si, respectively. No worsening of the SNRm was observed for these examples, whichever material was used, and the Co elution amounts were somewhat better than for Example 1. Also, the Co elution amount was smaller for Example 4, using a Ni30Cr seed layer, than for Example 5, using a Co30Cr4Fe2Si seed layer. This is thought to be because Co is not present in Ni30Cr. Upon using TEM cross-sectional lattice images and micro-electron beam diffraction to examine the seed layer crystal structure, it was found that the Ni30Cr seed layer had an fcc structure, while the Co30Cr4Fe2Si seed layer had an hcp structure.

Example 6 is a case in which the substrate was changed to a substrate with Al—NiP plating. Both the Co elution amount and the SNRm were substantially the same as for Example 1. Hence it was confirmed that this substrate has no effect.

TABLE 1

| | Co elution amount (ng/cm²) | SNRm (dB) | Δθ50 (deg) | Grain diameter (nm) | Seed layer crystal structure |
|---|---|---|---|---|---|
| Comparative Example 1 | 0.238 | 23.00 | 2.9 | 6.5 | fcc |
| Example 1 | 0.045 | 23.20 | 3 | 6.7 | |
| Comparative Example 2 | 0.048 | 22.65 | 2.9 | 6.5 | |
| Comparative Example 3 | 0.020 | 22.00 | 4.5 | 6.9 | |
| Comparative Example 4 | 0.150 | 23.10 | 2.8 | 6.6 | |
| Comparative Example 5 | 0.049 | 15.00 | 12 | 7 | bcc |
| Comparative Example 6 | 0.053 | 22.40 | 3.7 | 6.6 | fcc |
| Example 2 | 0.038 | 23.05 | 2.9 | 6.8 | |
| Example 3 | 0.015 | 23.10 | 3 | 6.7 | |
| Example 4 | 0.032 | 23.30 | 3.1 | 6.7 | |
| Example 5 | 0.047 | 23.10 | 3.2 | 6.5 | hcp |
| Example 6 | 0.040 | 23.10 | 3.2 | 6.5 | fcc |

Thus, a perpendicular recording medium has been described according to the present invention. Many modifications and variations may be made to the techniques and structures described and illustrated herein without departing from the spirit and scope of the invention. Accordingly, it should be understood that the methods and media described herein are illustrative only and are not limiting upon the scope of the invention.

This application is based on and claims priority to Japanese Patent Application JP 2008-054001, filed on Mar. 4, 2008. The disclosure of the priority application in its entirety, including the drawings, claims, and the specification thereof, is incorporated herein by reference.

Explanation of Reference Numerals

100 Magnetic recording medium
102 Nonmagnetic substrate
104 Soft magnetic backing layer
106 Seed layer
108 Corrosion prevention layer
110 Nonmagnetic intermediate layer
112 Magnetic layer
114 Protective layer
116 Liquid lubricant layer

[Patent document 1] Japanese Patent Laid-open No. 2003-223707 (US2003138666A1)
[Patent document 2] Japanese Patent Laid-open No. 2007-184019 (US2007153419A1)
[Patent document 3] Japanese Patent Laid-open No. 8-273155
[Patent document 4] Japanese Patent Laid-open No. 2002-100036
[Non-Patent document 1] Takenoiri et al., "CoPtCr—SiO2 Granular Perpendicular Recording Media", *J. Magn. Soc. Jpn.*, 2003, Vol. 27, No. 9, pp. 940-945
[Non-Patent document 2] H. Nakagawa et al., "CoB/Pd multilayers with PtB/Pd/MgO intermediate layers for perpendicular magnetic recording", *IEEE Trans. Magn.*, Vol. 39, No. 5, pp. 2311-2313, 2003

What is claimed is:

1. A perpendicular magnetic recording medium, comprising:
    a nonmagnetic substrate,
    a soft magnetic layer on the nonmagnetic substrate,
    a seed layer comprising one of Ni or Co and at least one element selected from the group consisting of Cr, Ta, Fe, Mo, Nb, Zr, Si and B, the seed layer having fcc crystal structure or hcp crystal structure,
    a corrosion prevention layer comprising the element Cr and at least one element selected from among Ni, W, Mo, Nb, Ta, and Ti, with a total atomic ratio of all components other than Cr equal to or less than 40 at %, the corrosion prevention layer having fcc crystal structure or hcp crystal structure,
    a nonmagnetic intermediate layer comprising an element selected from the group consisting of Ru, Re, Ti, Zr, Nd, Tm and Hf, disposed directly on the corrosion prevention layer,
    a magnetic layer disposed directly on the intermediate layer having an easy axis of magnetization oriented perpendicular to the substrate, and
    a protective layer on the magnetic layer,
    wherein the soft magnetic layer, the seed layer, the corrosion prevention layer, the intermediate layer and the magnetic layer are in this order.

2. The perpendicular magnetic recording medium according to claim 1, wherein the film thickness of the corrosion prevention layer is from 1.0 nm to 0.3 nm.

3. The perpendicular magnetic recording medium according to claim 1, wherein the intermediate layer is a layer of Ru.

4. The perpendicular magnetic recording medium according to claim 1, wherein the magnetic layer has a granular structure, with ferromagnetic crystal grains comprising a Co-based alloy surrounded by a nonmagnetic crystal grain boundary, the main component of which is an oxide.

5. The perpendicular magnetic recording medium according to claim 4, wherein the magnetic layer comprises a CoPt alloy.

6. The perpendicular magnetic recording medium according to claim 5, wherein the CoPt alloy is selected from the group consisting of CoPtCr, CoPt, CoPtSi, and CoPtCrB.

7. The perpendicular magnetic recording medium according to claim 4, wherein the magnetic layer comprises a CoCr alloy.

8. The perpendicular magnetic recording medium according to claim 7, wherein the CoCr alloy is selected from the group consisting of CoCr, CoCrTa, and CoCrTaPt.

9. The perpendicular magnetic recording medium according to claim 1, wherein the magnetic layer comprises Pt, Cr, and O.

10. The perpendicular magnetic recording medium according to claim 4, wherein the oxide material is selected from the group consisting of $SiO_2$, $Cr_2O_3$, $ZrO_2$, and $Al_2O_3$.

11. The perpendicular magnetic recording medium according to claim 5, wherein the oxide material is $SiO_2$.

12. The perpendicular magnetic recording medium according to claim 1, wherein the nonmagnetic substrate comprises glass, aluminum, or silicon.

13. The perpendicular magnetic recording medium according to claim 1, wherein the corrosion prevention layer is adjacent to the seed layer.

14. The perpendicular magnetic recording medium according to claim 1, wherein the soft magnetic layer, the seed layer, the corrosion prevention layer, the intermediate layer and the magnetic layer are consecutively laminated in this order.

15. The perpendicular magnetic recording medium according to claim 1, wherein the intermediate layer is a layer of Ru, Re, Ti, Zr, Nd, Tm or Hf.

* * * * *